United States Patent [19]
Holper et al.

[11] 3,742,269
[45] June 26, 1973

[54] ELECTRICAL SUB-FRACTIONAL MOTOR WITH ENCAPSULATED ROTOR

[75] Inventors: Frank Holper, Cary; Ronald A. Thon, Palatine, both of Ill.

[73] Assignee: Molon Motor & Coil Corp., Rolling Meadows, Ill.

[22] Filed: Sept. 3, 1971

[21] Appl. No.: 177,714

[52] U.S. Cl. .................................. 310/43, 310/172
[51] Int. Cl. ............................................ H02k 1/04
[58] Field of Search .................. 310/44, 43, 45, 89, 310/20, 83, 162, 166, 172, 254, 258; 264/272

[56] References Cited
UNITED STATES PATENTS

| | | | |
|---|---|---|---|
| 2,245,433 | 6/1941 | Delmonte | 310/172 |
| 3,502,030 | 3/1970 | Bukewihge | 310/172 |
| 2,758,226 | 8/1956 | Fisher | 310/45 |
| 2,798,995 | 7/1957 | McLean | 310/43 |
| 2,355,175 | 8/1944 | Olving | 310/172 |
| 3,483,409 | 12/1969 | Phillips | 310/90 |
| 3,013,167 | 12/1961 | Bobula | 310/90 |
| 3,238,286 | 3/1966 | Davis | 264/272 |
| 3,194,993 | 7/1965 | Hackney | 310/43 |
| 3,475,630 | 10/1969 | Heinzen | 310/43 |

Primary Examiner—R. Skudy
Attorney—James B. Kinzer, Thomas E. Dorn et al.

[57] ABSTRACT

A sub-fractional electrical induction motor, particularly adapted to use in xerographic office copy machines and other applications involving the presence of quantities of non-explosive magnetic powder; the portion of the magnetic stator frame encompassing the rotor is integrally mounted into a plastic seal block, sealing all sides of an axial rotor opening except for two open ends. The rotor shaft is supported in bearing brackets that extend across the open ends of the rotor opening and that are tightly engaged with the seal block and sealed to the seal block by two gaskets, thus effectively encapsulating the rotor.

3 Claims, 4 Drawing Figures

PATENTED JUN 26 1973 3,742,269

ELECTRICAL SUB-FRACTIONAL MOTOR WITH ENCAPSULATED ROTOR

BACKGROUND OF THE INVENTION

There are a number of applications for sub-fractional electrical motors in which the environment for the motor entails the presence of substantial quantities of powder material having magnetic characteristics. One particular example comprises xerographic copy machines, in which a toner powder having marked magnetic properties is often utilized for copy reproduction. The small electrical motors utilized in these machines attract the toner in quantities sufficient to clog the rotors and bearings, leading to premature motor failure. Of course, the difficulty can be solved by the use of totally enclosed motors or by other conventional expedients more frequently used in connection with motors that must operate in a potentially explosive environment. But the cost of totally enclosed motors is prohibitive, as compared with motors of conventional open structure, when applied to equipment of this general kind.

SUMMARY OF THE INVENTION

It is a principal object of the present invention, therefore, to provide a new and improved electrical induction motor suitable for use in an environment in which the motor comes into contact with quantities of magnetic powder, but which does not entail the use of a totally enclosed construction for the complete motor.

A specific object of the invention is to provide a new and improved open frame electric motor structure that effectively encapsulates the rotor and its bearings, affording positive protection against adverse ambient conditions, including the presence of magnetic powder.

A specific object of the invention is to provide a new and improved sub-fractional electrical induction motor of the open frame type that is inherently self-protecting against adverse environments but that entails only minimal additional expense in manufacture as compared with conventional motors.

Accordingly, the invention relates to a subfractional electrical induction motor adapted for use in the presence of magnetic contamination of a non-explosive nature. The motor comprises an open magnetic stator frame of electrical steel laminations defining a main flux path for the motor and having an opening for receiving a rotor, the stator frame affording at least one pair of pole pieces distributed equally around the rotor opening. The portion of the stator frame which encompasses the rotor opening is integrally molded into a plastic sealing block that completely seals all sides of the rotor opening except two axially aligned open ends. An electrical coil is magnetically coupled to the stator frame. A pair of bearing brackets are affixed to the stator frame and extend across the opposite open ends of the rotor opening in the frame, each bearing bracket being tightly sealed to the aforesaid sealing block to define an enclosed rotor space. A rotor is positioned wholly within the rotor space, being mounted on a shaft extending between and supported by the two bearing brackets, at least one of the bearing brackets having an axial opening through which the shaft projects to afford an output for the motor.

DESCRIPTION OF THE PREFERRED EMBODIMENT

Figure 1:
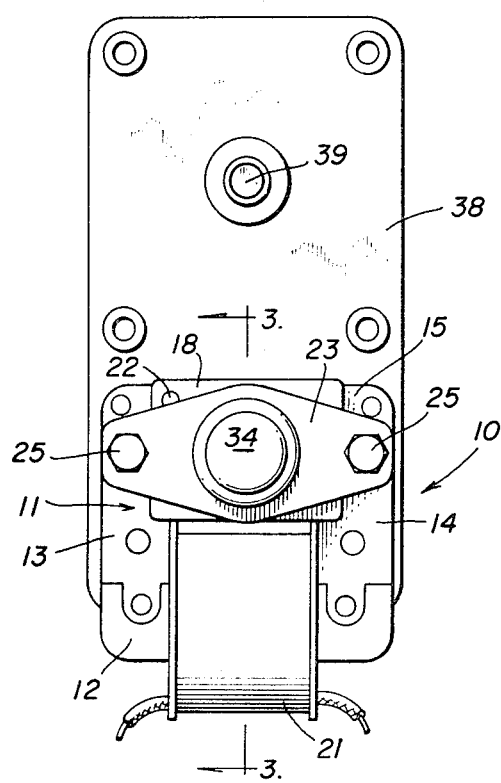
FIG. 1 is a front elevation view of a sub-fractional gearmotor constructed in accordance with one embodiment of the present invention.

The several figures of the drawing illustrate a sub-fractional electrical induction motor 10 constructed in accordance with one embodiment of the present invention. Motor 10 is a gearmotor and, typically, may include a gear reduction unit having a stepdown ration of between 3,200:1 and 4:1. Motor 10 is a two-pole motor having a normal output speed, for 60 hertz excitation, of approximately 3,200 rpm and may be constructed to operate on an input voltage of between 6 and 240 volts at 50 to 60 hz.

Motor 10 comprises an open magnetic stator frame 11 constructed in conventional manner of electrical steel laminations and defining a main flux path for the motor. The stator frame 11 is of U-shaped construction, and a laminated core 12 spans the open end of the frame, between the two side frame sections 13 and 14. The transverse leg 15 of frame 11 includes a circular rotor-receiving opening 17, best shown in FIG. 4. Motor 10 is a two-pole motor, as noted above. The poles are defined by slots in the frame, extending outwardly from opening 17, in conventional manner. The stator also comprises two shading coils 16, motor 10 constituting a shaded pole motor.

Figure 4:
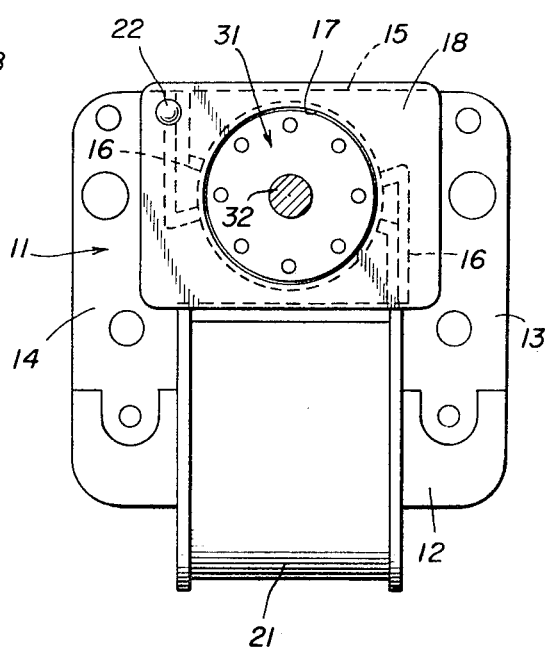
FIG. 4 is a detail sectional view taken approximately as indicated by line 4—4 of FIG. 3.

The transverse leg 15 of the stator frame is integrally molded into a plastic sealing block 18 that encompasses both shading coils 16 and that completely seals all sides of the rotor opening 17 except the two axially aligned open ends of the rotor opening. The particular resin selected for the molding of the sealing block 18 is not overly critical. The plastic material selected for this purpose should be one which affords stable dimensional properties when subjected to the quite limited heating produced by operation of a sub-fractional electric motor. Nylon is quite suitable for use in the fabrication of sealing block 18. Another suitable plastic material is ABS resin. Other resins may be selected. Within stator opening 17, the plastic on the surface of the laminated magnetic frame should be quite thin to avoid unduly increasing the motor air gap; the thickness of the plastic in this part of the motor, as shown in FIG. 4, has been emphasized somewhat to permit effective interpretation of the drawing. Preferably, a small boss or other indicator 22 is formed in plastic seal block 18 to identify the location of one shading coil 16 and thus permit effective assembly of motor 10 for the desired direction of rotation.

Figure 2:
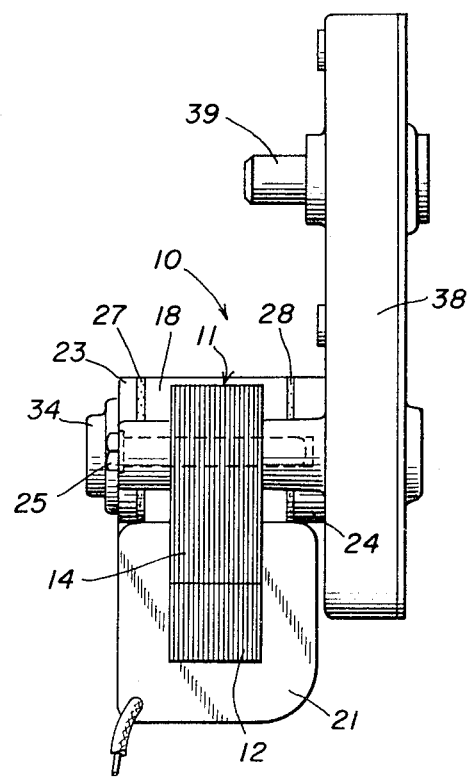
FIG. 2 is a side elevation view of the motor of FIG. 1.

Motor 10 further comprises an electrical coil 21 mounted on the stator coil 12. A pair of bearing brackets 23 and 24 are affixed to stator frame 11 and extend across the opposite open ends of rotor opening 17. The bearing brackets 23 and 24 are secured to frame 11 by a pair of bolts 25; each bolt 25 extends from bracket 23 through frame 11 and is threaded into a tapped opening in bracket 24 (see FIG. 2). The two bearing brackets are preferably formed as zinc die castings, although other structural forms may be utilized if desired.

A gasket 27, formed of cork or other suitable material, is interposed between bearing bracket 23 and seal block 18. A similar gasket 28 is positioned between bracket 24 and the plastic seal block. When motor 10 is assembled, tightening of the bolts 25 compresses gaskets 27 and 28 and assures a tight seal between each of the bearing brackets and the plastic seal block 18. Gaskets 27 and 28 may be eliminated if the mating surfaces of the bearing brackets and the seal block are machined or otherwise fabricated with sufficient precision to assure a tight seal for the enclosed rotor space defined by these elements of the motor.

Figure 3:
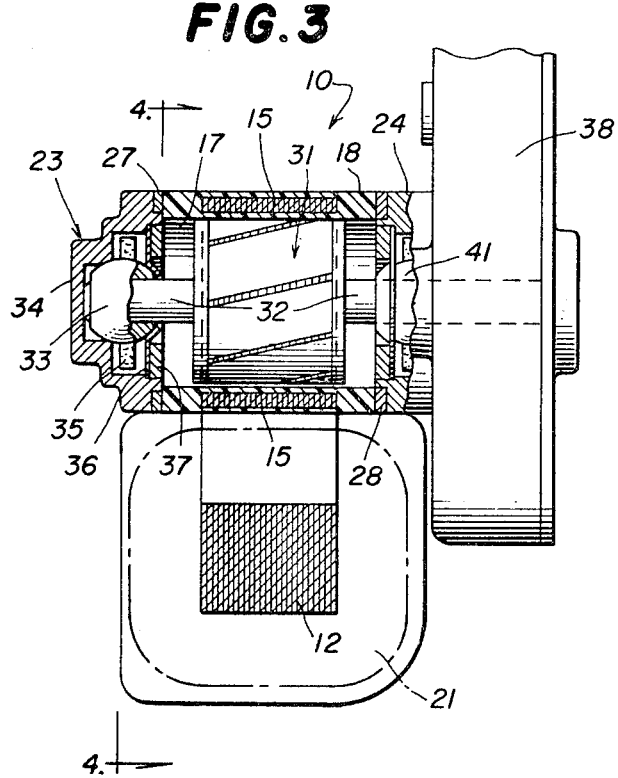
FIG. 3 is a sectional view taken approximately along line 3—of FIG. 1.

An induction motor 31 of conventional construction is positioned within the rotor space defined by the frame opening 17, the seal block 18, and the bearing brackets 23 and 24. Rotor 31 is mounted upon a shaft 32 that extends axially through the rotor opening 17, the opposite ends of shaft 32 being supported in bearing brackets 23 and 24 respectively. As seen in FIG. 3, the left-hand end of shaft 32 carries a ball-like bearing member 33 that is supported in an end cap 34 formed integrally with bearing bracket 23. A felt lubricant reservoir member 35 is positioned within bearing bracket 23 in encompassing relation to the bearing element 33, and the inner part of the end cap 34 is closed by a spring 36 held in place by a retainer washer 37.

The other end of shaft 32, the right-hand end as seen in FIG. 3, projects through an axial opening in bearing bracket 24 to afford an output for the motor. This end of shaft 32 is journalled in a bearing 41 and extends into a gear box 38. The bearing bracket 24 constitutes an integral part of a single casting that is also the cover for gear box 38. The working output of motor 10 is taken from an output shaft 39 (FIGS. 1 and 2); the internal gear arrangement for gear box 38 is not critical to the present invention and has not been shown in detail.

Although the foregoing description of motor 10 is directed to a shaded pole motor, it will be apparent that the same construction can be employed for other sub-fractional electric motors, including split phase motors and capacitor motors. In each instance, regardless of motor type, the plastic seal block should encompass the entire rotor opening and should be tightly sealed to the bearing brackets to fully encapsulate the rotor. Of course, the same construction can be utilized on motors having four, six, or even more poles.

The operation of gearmotor 10 is quite conventional. The motor functions as a normal shaded pole motor, the output speed of shaft 39 being determined by the gear arrangement built into gear box 38. Unlike a conventional open frame motor, however, the rotor 31 is effectively totally encapsulated by the seal block 18 and the bearing brackets 23 and 24. As a consequence, magnetic powder or other foreign materials cannot get into the motor bearings or into the air gap between the stator and rotor of the motor. Thus, motor 10 affords a long operating life, even in adverse environments such as in xerographic copying machines. On the other hand, the structural modifications incorporated in motor 10, as compared with a conventional motor, consisting primarily of the seal block 18, are quite inexpensive and do not materially increase the manufacturing cost of the motor.

We claim:

1. A sub-fractional electrical induction motor adapted for use in the presence of magnetic contamination of a non-explosive nature comprising:

an open magnetic stator frame of electrical steel laminations defining a main flux path for the motor and having an opening for receiving a rotor, said stator frame affording at least one pair of pole pieces distributed equally around said rotor opening;

the portion of said stator frame encompassing said rotor opening being integrally molded into a plastic sealing block completely sealing all sides of the rotor opening except two axially aligned open ends;

an electrical coil magnetically coupled to said stator frame;

a pair of bearing brackets, affixed to said stator frame and extending across the opposite open ends of said rotor opening, each bearing bracket being tightly sealed to said sealing block to define an enclosed rotor space;

two sealing gaskets, individually interposed between said sealing block and respective ones of said bearing brackets;

and a rotor, positioned wholly within said rotor space, said rotor being mounted on a shaft supported in said bearing brackets, at least one of said bearing brackets having an axial opening through which said shaft projects to afford an output for the motor.

2. A sub-fractional electrical induction motor according to claim 1, in which said motor further comprises at least two shading coils, one for each pole of said motor, mounted on said stator frame, and in which said shading coils are integrally molded into said plastic sealing block.

3. A sub-fractional electrical induction motor according to claim 2, in which an external indicator is molded into said sealing block to identify the location of one of said shading coils.

* * * * *